(12) United States Patent
Condon et al.

(10) Patent No.: US 12,088,879 B2
(45) Date of Patent: Sep. 10, 2024

(54) HOME AUDIO MONITORING FOR PROACTIVE VOLUME ADJUSTMENTS

(71) Applicant: DISH Network L.L.C., Englewood, CO (US)

(72) Inventors: Caroline Condon, Englewood, CO (US); Luke Vanduyn, Englewood, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 112 days.

(21) Appl. No.: 17/884,171

(22) Filed: Aug. 9, 2022

(65) Prior Publication Data

US 2024/0056632 A1 Feb. 15, 2024

(51) Int. Cl.
H04N 21/442 (2011.01)
G06F 3/16 (2006.01)
H04N 21/422 (2011.01)

(52) U.S. Cl.
CPC ....... H04N 21/44218 (2013.01); G06F 3/165 (2013.01); H04N 21/42203 (2013.01)

(58) Field of Classification Search
CPC ......... H04N 21/42203; H04N 21/4394; H04N 21/4852; H04N 21/4532; H04N 21/4884
See application file for complete search history.

(56) References Cited

U.S. PATENT DOCUMENTS

| | | | |
|---|---|---|---|
| 10,097,150 B1 | 10/2018 | Peterson et al. | |
| 10,299,061 B1* | 5/2019 | Sheen | H04S 7/301 |
| 2005/0239396 A1 | 10/2005 | Kreifeldt | |
| 2006/0242314 A1* | 10/2006 | Logvinov | H04N 21/43615 709/231 |
| 2008/0043996 A1* | 2/2008 | Dolph | H04N 21/4334 379/388.07 |
| 2009/0319672 A1 | 12/2009 | Reisman | |
| 2011/0231769 A1 | 9/2011 | Tovar | |
| 2012/0189140 A1* | 7/2012 | Hughes | H04M 3/56 381/123 |
| 2013/0078979 A1 | 3/2013 | Bell et al. | |
| 2013/0295913 A1 | 11/2013 | Matthews, III et al. | |
| 2014/0314237 A1* | 10/2014 | Cottrell | H04N 21/8456 381/2 |
| 2015/0156633 A1 | 6/2015 | Karaoguz et al. | |
| 2017/0026382 A1 | 1/2017 | Trigger et al. | |
| 2020/0007552 A1 | 1/2020 | Trigger et al. | |
| 2020/0036718 A1 | 1/2020 | Sodah | |
| 2020/0304469 A1 | 9/2020 | Reimer | |
| 2020/0356687 A1 | 11/2020 | Salzman et al. | |
| 2022/0286776 A1 | 9/2022 | Torok | |

FOREIGN PATENT DOCUMENTS

WO 2021/103920 A1 6/2021

* cited by examiner

*Primary Examiner* — Jason Salce
(74) *Attorney, Agent, or Firm* — Seed IP Law Group LLP

(57) ABSTRACT

A method includes monitoring, by a gateway device comprising a processor, connected devices that are connected to the gateway device, wherein each connected device comprises a transceiver configured to communicate with the gateway device; determining, by the gateway device, whether a first connected device of the connected devices increases an audio level in a target location greater than a predefined threshold; and in response to the gateway device determining that the first connected device audio level at the target location is greater than the predefined threshold, the gateway device reduces audio of the first connected device.

20 Claims, 8 Drawing Sheets

US 12,088,879 B2

HOME AUDIO MONITORING FOR PROACTIVE VOLUME ADJUSTMENTS

BACKGROUND

Currently, users enjoy listening to devices at home but the volume levels on such devices may interfere with volume levels in other rooms. For example, if a person is watching a movie in the living room and the movie volume is such that the volume in a baby's room wakes up the baby.

Alternatively, when a user is having a party that is loud or walks into a different room from an entertainment device (e.g., a TV), then the user may no longer hear the device, either because other noise is louder than the device or because the device is too far from the user.

There are thus currently issues with volume control in a home which can interfere with the overall user experience.

SUMMARY

Disclosed herein is a system to help users set their TV volumes at the level that best achieves their goals, taking into account contextual information including time, location and other activities happening in the house. Users can define simple rules according to their priorities. For example, "After 9 pm, never let the TV get loud enough to wake up the baby". In addition to rules created directly by the user, the system will use machine learning to analyze regular patterns of volume changes and begin to anticipate them—for example, if the user often turns down the TV volume immediately after a phone rings nearby, the gateway according to embodiments will begin to do that automatically.

Generally, various embodiments of apparatus, systems and/or methods are described for managing audio of home devices. According to one embodiment, a method includes monitoring, by a gateway device comprising a processor, connected devices that are connected to the gateway device, wherein each connected device comprises a transceiver configured to communicate with the gateway device; determining, by the gateway device, whether a first connected device of the connected devices increases an audio level in a target location greater than a predefined threshold; and in response to the gateway device determining that the first connected device audio level at the target location is greater than the predefined threshold, the gateway device reduces audio of the first connected device.

According to one embodiment, a gateway device includes a processor and a storage medium for storing a device list and instructions. The processor is configured, when executing the instructions, for: monitoring connected devices that are connected to the gateway device, wherein each connected device comprises a transceiver configured to communicate with the gateway device; determining whether a first connected device of the connected devices increases an audio level in a target location greater than a predefined threshold; and in response to the gateway device determining that the first connected device audio level at the target location is greater than the predefined threshold, the gateway device reduces audio of the first connected device.

According to one embodiment, a nontransitory computer readable medium embodies instructions that, when executed by a processor of a gateway device, performs a method. The method includes monitoring connected devices that are connected to the gateway device, wherein each connected device comprises a transceiver configured to communicate with the gateway device; determining whether a first connected device of the connected devices increases an audio level in a target location greater than a predefined threshold; and in response to the gateway device determining that the first connected device audio level at the target location is greater than the predefined threshold, the gateway device reduces audio of the first connected device.

BRIEF DESCRIPTION OF THE DRAWINGS

The same number represents the same element or same type of element in all drawings.

DETAILED DESCRIPTION OF EMBODIMENTS

The various embodiments described herein generally provide apparatus, systems and methods for a gateway of a location/home to manage/control output of devices in a home or business, such as to manage audio levels of devices and/or control the outputs or inputs of a device in the location/home.

Internet to a particular location (e.g. a home, business or other location) may be supplied by any source, such as an fixed wireless or cellular network, a satellite or cable internet distribution system, or other communication networks. This internet feed is received by a gateway device, such as a router, at the location, such as a person's home. The gateway device then provides various devices, such as mobile phones, computers, etc., in a home with internet.

Additionally, homes may further include a feed for television or other services for media to the gateway of the home where such feed may be separate from the internet feed.

In this regard, the gateway to a location can receive both internet and audio/video feeds. As such, it makes sense to use the gateway to control all devices in a home instead of potentially having to control each device independently.

FIGS. 1-8 below explain various embodiments of this type of home management. It should be noted that the exemplary embodiments of FIGS. 1-8 relate to management of volume but this is only for ease of illustration and the present invention should not be limited to management of volume or even audio. For example, the home systems may manage any operations of the connected devices, including displays, internet, notifications, or any other output means of the connected devices or an input to the connected devices.

Generally, this can be done in multiple different ways, which are described herein according to various embodiments. For example, the gateway controls home audio monitoring and adjusting as will be described in more detail below with regard to the embodiments of FIGS. 1-4, and the gateway performs anti-distraction features as provided in embodiments of FIGS. 5-8.

Whole Home Volume Control Feature

Figure 1:
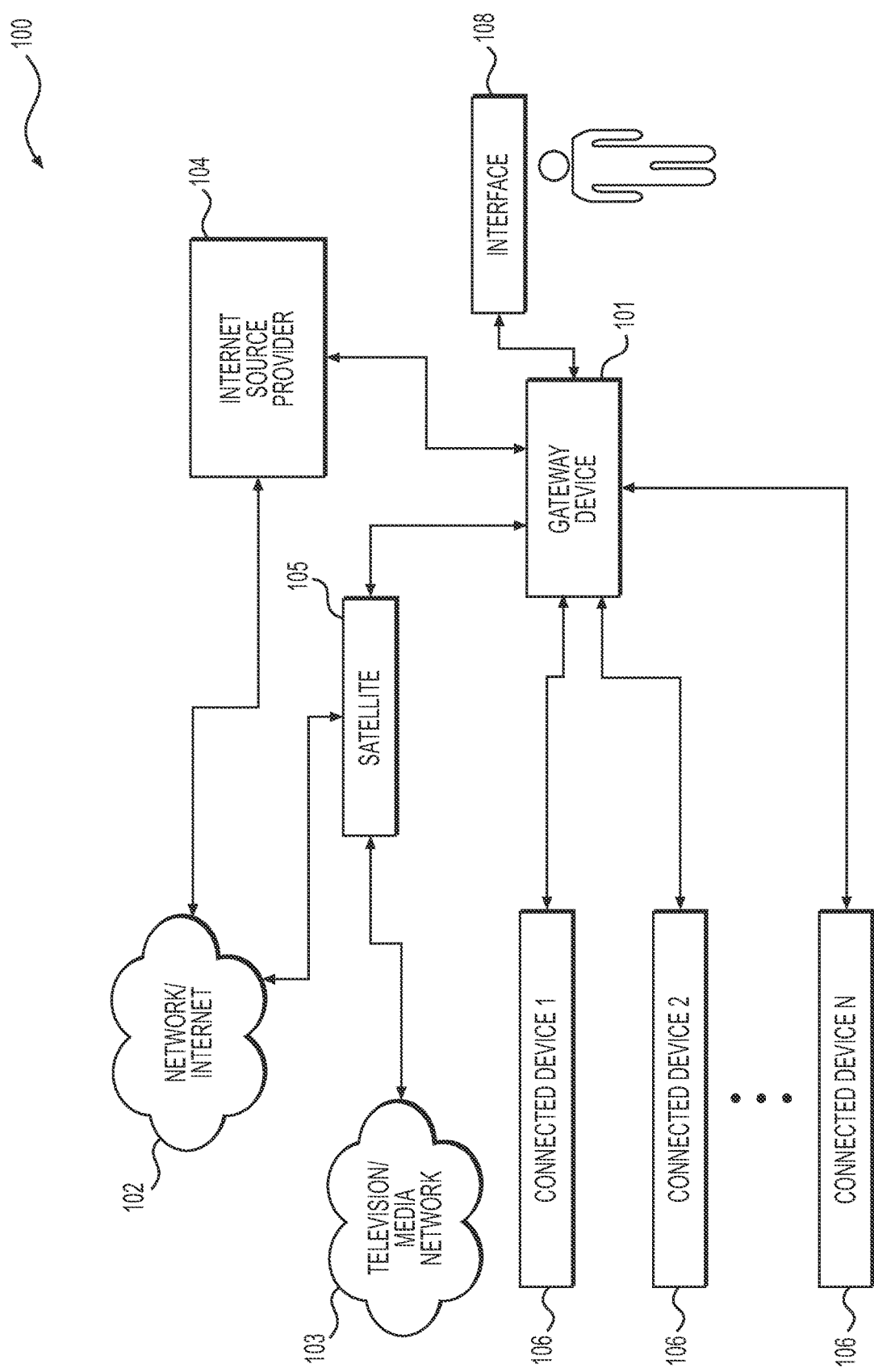
FIG. 1 illustrates an embodiment of a home audio monitoring/adjustment system that includes a gateway device, according to some embodiments.
Figure 3:
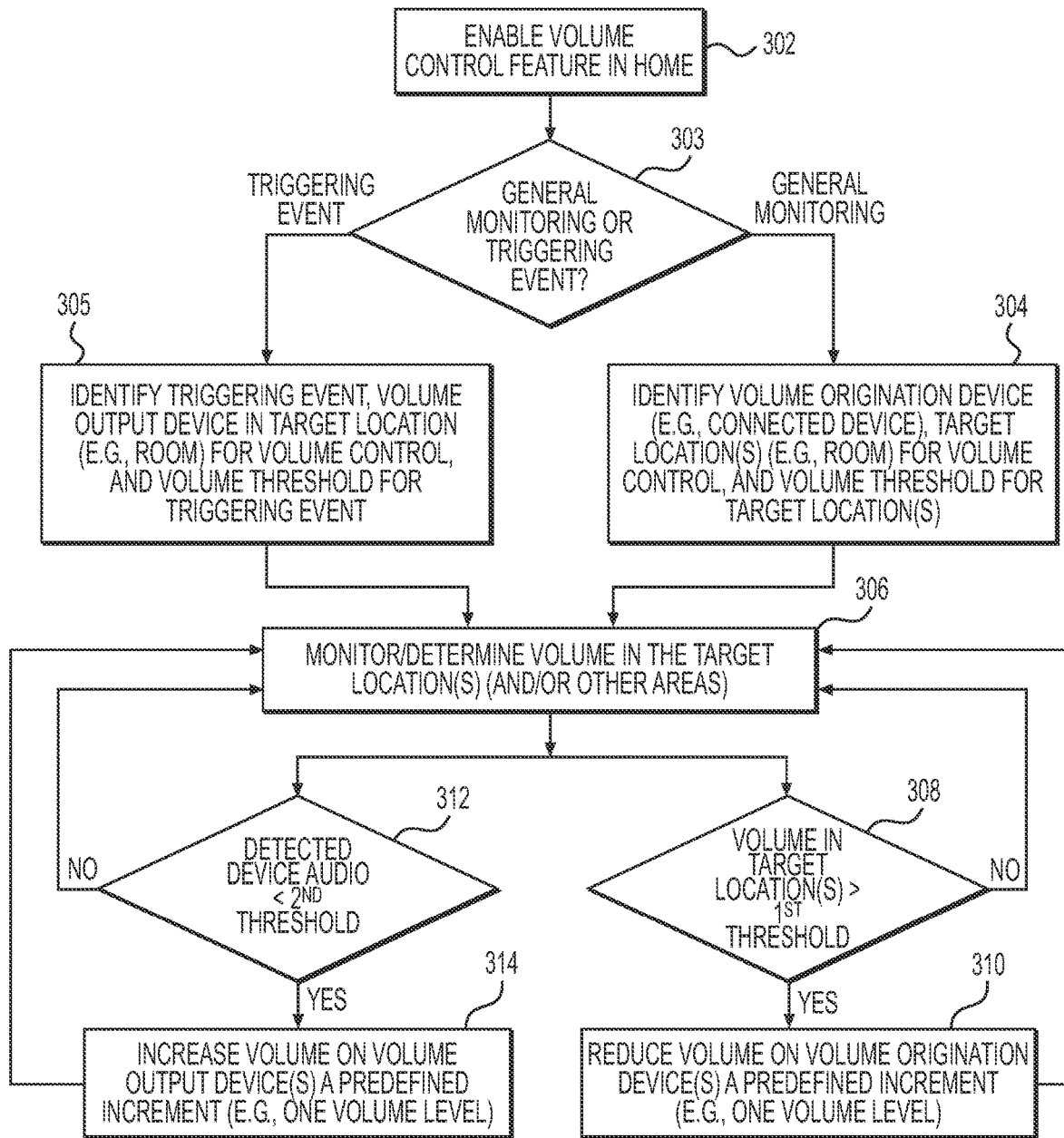
FIGS. 3 and 4 illustrate methods of managing home audio according to some embodiments.

Starting first with the home audio control feature, FIG. 1 illustrates an embodiment of a home audio monitoring/adjustment system 100 for managing home audio/volume. The home audio monitoring/adjustment system 100 includes a gateway device 101, a network for internet 102, a network for television/media 103 and connected devices 106. While FIG. 3 illustrates that the network for internet 102 and network for television/media 103 are separate networks, it should be understood that the network for internet 102 and network for television/media 103 may be the same network or one of the networks 102 may employ both a television/media feed and an internet feed.

Network 102 is a system that connects various computers in order to deliver over wired lines or wirelessly internet access to the gateway 101, while network 103 is a system that connects various computers in order to deliver over satellite television/media access to the gateway 101. Internet network 102 may comprise any type of communication network utilized between the gateway device 101 and the internet source provider 104. Exemplary communication networks for network 102 may include internet distribution networks (e.g., satellite and cable internet networks), wireless communication networks, public switched telephone networks (PSTN), and local area networks (LAN) or wide area networks (WAN) providing data communication services. Network 102 may utilize any desired combination of wired (e.g., cable and fiber) and/or wireless (e.g., cellular, satellite, microwave, and radio frequency) communication mediums and any desired network topology (or topologies when multiple mediums are utilized). The gateway device 101 may communicate with the transmission network 102 through a wired or wireless connection. The network 102 may distribute data signals in digital or analog form to the gateway device 101.

Network 103 uses a satellite 105 to communicate the television/media feed from the television/media feed and the gateway 101. For example, a satellite dish antenna may be employed at a home that is directed to the satellite 105 to communicate with the television/media network 103.

The home audio monitoring/adjustment system 100 of FIG. 1 also includes a series of connected devices 106 that are connected to a single gateway device 101. FIG. 1 shows a number N of connected devices 106 (i.e., connected devices 1 to N). Each of the connected devices 106 could be any electronic device that uses the internet, such as smart appliances (e.g., refrigerators, dishwashers, etc.), wearables (e.g., smart watches, fitness trackers, etc.), security devices (e.g., smart door locks, baby monitors, cameras, security system, etc.), computing devices (e.g., computers, phones, scanners, printers, etc.), smart home devices (e.g., thermostats, televisions, home entertainment systems, Amazon Alexa devices, etc.), vehicles, and many other devices.

The gateway device 101 may be configured to receive content from one or more content via networks 102, 103 via one or more providers. In at least one embodiment, the gateway device 101 is a wireless router that is employed in a residential location. In another embodiment, the gateway device 101 is a satellite or cable internet converter box combined with a router so that signals are received from an internet provider (via Satellite, Data Over Cable Service Interface Specification (DOCSIS), etc.), the signals are converted for use by the router, and the router then routes the signals to the connected devices 106 in accordance with embodiments of the present application. It is to be appreciated that the gateway device 101 may also be embodied as an apparatus combining the functionalities of one or more of: a router, display device, a set-top box, DVR, and/or an internet converter box.

The gateway device 101 is communicatively coupled to the connected devices 106 through any type of wired or wireless connection. Exemplary wired connections include Ethernet wiring, and exemplary wireless connections include WiFi and Bluetooth.

The gateway device 101 also includes an interface 108 that a user is allowed to interact with to configure settings with the gateway device 101, monitor home audio adjustments or distractions, manually adjust home audio, manually activate features or modes of the system, or perform any other input to the gateway and its associated software features as described herein.

The gateway device 101 is configured to receive an audio/video feed and internet from one or more content sources, such as the internet source provider 104, and deliver such data to a presentation device (which could be one of the connected devices 106). Each of the networks 102, 103 could have separate source providers or a single source provider. For example, internet source provider 104 could be the provider for both networks 102 and 103. In any event, the content source may comprise any system or apparatus configured to provide presentation data, such as the video/audio stream or internet, to the presentation device. Exemplary content sources include television distribution systems (e.g., over the air distribution systems, cable television distribution systems, satellite television distribution systems and broadband distribution systems), the internet, and the like.

The gateway device 101 is discussed in more depth below with regard to FIG. 2.

The gateway device 101 is configured to receive an audio/video feed 201 and internet 202 from one or more content sources and deliver such data to a presentation device (which could be one of the connected devices 106). The content source may comprise any system or apparatus configured to provide presentation data, such as the video/audio stream or internet, to the presentation device. Exemplary content sources include television distribution systems (e.g., over the air distribution systems, cable television distribution systems, satellite television distribution systems and broadband distribution systems), the internet, and the like.

Figure 2:
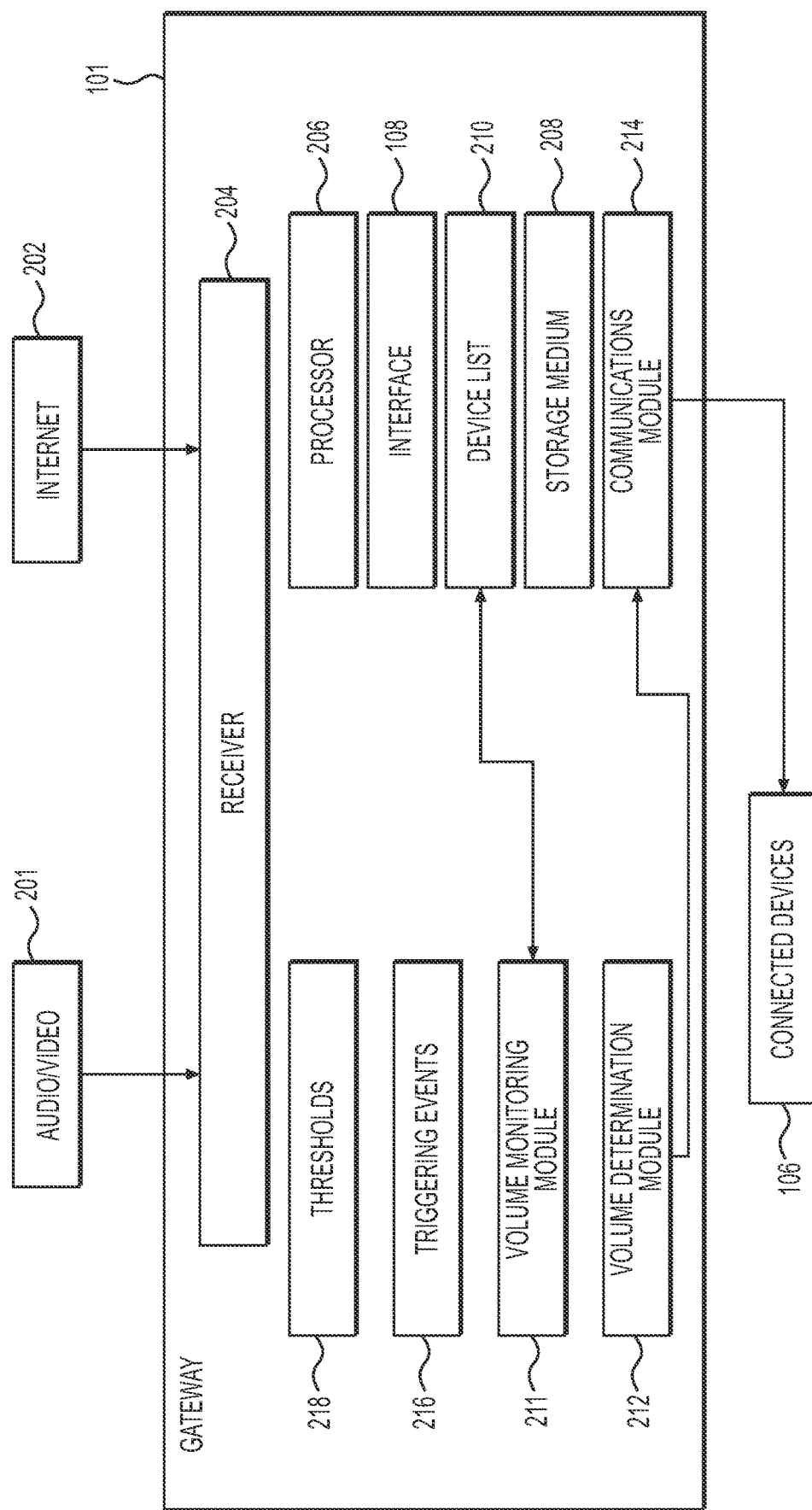
FIG. 2 illustrates an embodiment of a gateway device managing home audio, according to some embodiments.

FIG. 2 illustrates an embodiment of the gateway device 101 of FIG. 1. The gateway device 101 comprises a user interface 108, a receiver 204, a processor 206, storage medium 208, a device list 210, a volume monitoring module 211, a volume determination module 212, communications module 214 and triggering events 216. Each of these components is discussed in greater detail below.

The gateway device 101 receives the internet feed 202 and audio/video feed 201 at the receiver 204. The receiver 204 is a port on the gateway device 101 that receives data signals from a wired or wireless connection via network 102. These signals are then processed by the processor 206 and software in the gateway device 101 to effectively receive the respective data feeds from networks 102 and 103 so that they can be delivered to the connected devices 106.

The processor 206 may be a hardware processor (e.g., CPU) that is configured to execute instructions stored in storage medium 208. The processor 206 is configured to interact with each of the modules 211, 212, and 214 and stored data, such as device list 210 and other software and/or data stored in the storage medium 208. For example, the processor 206 is configured to perform at least one or more or all of the steps presented herein, including those shown in FIGS. 3 and 4.

Any of the modules 211, 212, and 214 and other software modules or data may be stored in the storage medium 208. For example, the device list 210 is stored on the storage medium 208. The storage medium 208 may be any type of temporary or persistent storage device capable of storing instructions and data. The storage medium 208 may be internal and/or external to the gateway device 101 and may include one or more storage devices. In one embodiment, the storage medium 208 is a non-transitory computer readable storage medium having a physical presence configured for long term storage of data. For example, the storage medium 208 may be an internal hard drive or flash memory.

The device list 210 is data indicating the connected devices 106 connected to the gateway device 101. The device list 210 is updated by the processor each time a new device is connected to the gateway device 101, according to an embodiment. The device list 210 includes a list of devices, an identifier associated with each device, the type of device (e.g., television, mobile phone, tablet, etc.), features of each device (e.g., microphone, speaker, notification features, displays, etc.), various schedules of each device (e.g., do not disturb mode, etc.), and/or other information. For example, the device list 210 could be connected device 1, connected device 2 and connected device 3 and priority values of 1, 1, 3, respectively, indicating that connected devices 1 and 2 are highest priority and connected device 3 is a third level of priority.

This device list 210 is updated on a real time basis when a new connected device is connected. For example, when the gateway device 101 connects a new connected device 106, the gateway device 101 may then add a new entry immediately to the device list 210 with the newly-connected device 106 and its associated features.

The volume monitoring module 211 is a software module with instructions that are executed by the processor to monitor the audio of a device and/or a location. The volume monitoring module 211 provides this information to the volume determination module 212 in order to determine the volume at a particular location. For example, the gateway device 101 may be instructed to monitor the volume at a target location. As such, the connected devices 106 proximate to the identified target location would monitor the target location by sending the audio detected (using a microphone of the connected device) to the gateway device 101. The volume monitoring module 211 can receive audio data from all of the connected devices periodically or continuously at all of the time and measure the sound levels at all locations. As such and when the user has identified (via the user interface 108) the target location (e.g., baby room), the volume monitoring module 211 will filter the data received from the microphones associated with the target location to determine if the sound level of target location is greater than a threshold 218.

The volume monitoring module 211 can be activated based on a triggering event or be manually started. For example, the volume monitoring module 211 can start at a certain time (e.g., after 8 pm to correspond to a child's bedtime) set by the user in the interface 108 of the gateway device 101.

The volume determination module 212 determines when the volume of one or more of the connected devices 106 exceeds a predefined threshold 218 in some embodiments. The predefined threshold 218 may be defined by the user or a manufacturer of the gateway device 101. This process is discussed in more depth with regard to FIGS. 3 and 4. The predefined threshold 218 is saved in the gateway device 101 such as in the storage medium 208 or in the volume determination module 212

The communications module 214 communicates with the volume determination module 212 and the volume monitoring module 211 to deliver and allow/disallow audio and/or internet data to the connected devices 106. This may be done wirelessly over a short range network, such as WiFi or Bluetooth, or via a wired connection. Specifically, the volume determination module 212 and the volume monitoring module 211 will send to the communications module the connected device ID as well as a flag for each respective connected device 106 as to whether the audio levels at the target location and another flag for each respective connected device 106 if audio should be lower in one embodiment. Additionally, for each connected device 106, the volume determination module 212 and/or the volume monitoring module 211 is configured to limit the audio/video feed 201 to the specific connected devices 106. In this regard, the communications module 214 is configured to reduce the audio for one or more connected devices 106 by the volume determination module 212.

FIG. 3 illustrates, generally, a method of managing audio according to some embodiments. FIG. 3 addresses a situation where there is audio greater than a threshold in a target location.

In FIG. 3, the connected devices 106 are connected to the gateway device 106, which may be done by a pairing process so that the connected devices 106 connect to the gateway device 106. Any number of connected devices 106 may connect to the gateway device 106 and devices may continually be added or drop from the gateway device 106.

In block 302, the volume control feature is enabled in a home. This may be accomplished by the user activating such feature using the interface 108 at the gateway device 101. Also, the gateway device 101 will determine what devices belong in the device list 210 of connected devices 106 based on a function (e.g., audio output capabilities, type of device, etc.) of the device or based on other predefined criteria, in some embodiments. In some embodiments, the device list 210 could be manually inputted by a user or manufacturer and can be modified at any time.

When the volume control is enabled, the gateway device 101 can perform a one or more of a plurality of functions. First, the gateway device 101 may monitor predetermined triggering events to determine if volume control for that particular event should start. For example, the triggering events may be a user receiving a phone call, the user walking away from a room, a high noise event (e.g., party), etc.

In block 303, the method determines whether there should be general monitoring of a target location, monitoring of volume levels based on a triggering event, or a combination thereof. Blocks 304, 306, 308 and 310 illustrate one embodiment where a target location(s) is monitored to ensure that location(s) is below a first predefined threshold. Blocks 305, 306, 312, and 314 relate to various triggering events where there may be different preset thresholds and conditions that are enabled based on a particular triggering event. Both of these embodiments are discussed below, starting with the embodiment of blocks 304, 306, 308 and 310.

In block 304, one of the connected devices 106 may be identified as the volume origination device and a target location may be identified as a room or rooms that the user wishes to ensure audio is not greater than a predefined threshold, such as wanting the sound in a baby's room to be quiet. The volume threshold for the target location is also determined, such as by accessing a first predefined, prestored threshold. In one embodiment, the target location may be a single room in a home where one or more microphones in that room are used to monitor the audio levels in the room while a connected device 106 in another room is causing the audio levels in the target location to be elevated. In this regard, the user wishes to monitor and control the audio levels in the target location by controlling connected device(s) 106 in that room and/or in other rooms. In another embodiment, the user may wish to monitor audio levels in multiple target locations and thus, audio levels in all of the target locations has to be below the predefined thresholds or otherwise audio output of certain connected devices 106 should be lowered in order to lower the detected audio levels in the target location(s).

In this regard, the volume or audio levels in the target location(s) are monitored, as provided in block 306. This is done by using microphone devices in existed devices in the home, which could be from connected devices 106 or other devices. For example, the microphone in a child's room may be in a baby monitor or a tablet while a television is causing the audio levels in the child's room to be elevated. In this regard, the baby monitor or tablet would be continuously or periodically providing audio levels in the child's room.

The system determined if the monitored audio levels remains below a first predefined threshold, as provided decision block 308. If not, the method may proceed back to block 306 where the audio levels in the target location is continually monitored while the volume control feature is active (such as during a predetermined time period). However, when the monitored audio levels increases above the predefined threshold, the system determines that audio from at least one of the controlled devices 106 needs to be reduced, and proceeds to identify which of the connected devices should be reduced and then reduces such audio level of the identified connected device(s), as shown in block 310.

There may be multiple connected devices that are contributing to the audio levels in the target locations. The gateway device 101 determines which connected device is outputting audio levels are contributing to the audio levels. This may be determined by changing the levels of a single connected device 106 and determining if the audio levels are correspondingly changed in the target location. In this regard, with the change in each connected device, the gateway device 101 can determine which connected devices 106 contribute the most to audio levels at the target location. In this regard, the gateway device 101 can lower one or more of the connected devices 106 in order to change the audio level at the target location. For example, a single connected device 106 can be reduced completely or all connected devices can be lowered a certain amount. In another example, the connected devices that most reduce the audio levels can be reduced in a prioritized manner. For example, for the connected devices 106 that have the most effect on the audio levels in the target location, those devices can be reduced while other connected devices 106 which have the lowest effect on the target location are unchanged or changed minimally relative to the other connected devices 106. Any combination of controlling connected devices 106 may thus be employed to reduce the audio levels in the target locations.

Also, the gateway device 101 may be able to detect which connected devices 106 are outputting audio levels based on the audio/video feed being delivered from the gateway device 101 to such connected devices 106. In this regard, the gateway device 101 will know which devices are contributing to the audio levels at different locations throughout a home.

As such, the gateway device 101 may be configured to be able to control certain connected devices 106 in order to lower audio levels in different areas of the home. Moreover, the gateway device 101 is configured to determine which connected devices 106 contribute audio levels at what weight by performing a diagnostic test. In this regard, when a user selects a certain target location, the gateway device 101 will know which connected devices to control to change the audio levels in a desired target location.

Blocks 305, 306, 312, and 314 illustrate other embodiments relating to triggering events. For example, a triggering event may be a user receives a phone call while a television is on. Another triggering event may be the detection of a lot of noise caused by the user hosting a party with many people and thus, the detected audio of the device relative to the noise of in the same room as the device may be too low for others to discern the audio of the device. For example, if a user is having a superbowl watching party at her house with 15 people, the noise of people talking may drown the audio of the television and thus, others either not being able to hear the television or having to tell people to be quiet to hear the television. Yet another triggering event could be that the user walks into a room that is separate from the room where the outputting device is located, and thus, the discernable audio of the device may not be heard or understood while the user is in the separate room. There are other possible triggering events as well and the present invention should not be limited to any particular event and blocks 305, 306, 312, and 314 can be used to help users to hear certain audio of certain devices based on what triggering event occurs.

In block 305, the gateway device 101 identifies: the triggering event, the volume outputting device for volume control, and a predetermined volume threshold level for the triggering event. The triggering event may be predefined in the storage medium and can be detected based on numerous methods. For example, if there is a phone call, the gateway device 101 determines the location of the phone and whether a connected device is within a predefined distance (e.g., same room) as the phone. The location of the phone may be determined using any of a number of methods, such as using determining the Bluetooth distance from one or more Bluetooth devices (which may be placed throughout the house), determining which room the phone is in based on the room registering the highest audio level of the phone ring, and the like.

The triggering event can also be detected based on monitoring motion of a user from one room to the next. The triggering event may be manually input as well, such as the user manually inputting in party mode.

In any event, once the triggering event is identified, the gateway device 101 then will load the particular pre-stored parameters associated with the triggering event. Each triggering event may have saved for that particular event, the volume threshold maximum for a location, volume-to-noise threshold minimum, a volume threshold level for rooms adjacent to the target location, the volume output device to monitor, etc. For example, the triggering event may be a party where the user has preset that the volume-to-noise ratio should be at least a predetermined level so that the television audio can be discerned instead of being drowned out by conversations.

In another example, if the triggering event is that the user walks into a kitchen and the monitored device is a TV in the living room, the gateway device 101 would determine what the minimum level of the audio should be in the kitchen and determines if such level is reached (as discussed below).

In any event, once the particular prestored conditions for the triggering event are loaded, the gateway device 101 will then monitor or determine the volume levels in the required location(s) (e.g., target location(s), areas adjacent to the target location, etc.), as provided in block 306. This is done by monitoring the audio levels in those locations as discussed above using microphones in the target location(s). Also, other data may also be collected including motion sensing data, noise data, etc.

In decision block 312, the gateway device 101 then determines if the detected device audio is less than a predetermined second threshold. The detected device audio means the audio of the connected monitored device such that such audio can be understood by a user, such as whether the user can (1) hear the device audio loud enough, and (2) understand the audio over noise. If the user is in another room, that user may not be able to hear the audio in that other room based on the audio being attenuated to the user (e.g., due to distance from the device, obstructions in between the device and the user, etc.). If there are others talking in the room, the noise of such talking may make it so that the user cannot understand the audio (e.g., conversations in the audio, songs in the audio, etc.). As mentioned above, this predetermined second threshold is preset based on the particular triggering event and can be modified in real time and then saved for future use.

If the detected device audio is not less than the predetermined second threshold, the method may continue to perform the monitoring discussed above relative to block 306. However, if the detected device audio is less than the predetermined second threshold, the method may continue to block 314, where the volume of the output device in the target location is increased by a predefined increment, which may be a single volume level increase. The method then repeats block 306, 312 and 314 until the predetermined second threshold is met.

In this regard, when a user walks out of a room, the gateway device 101 can increase the volume so that the user can still hear the device. Also, when others are adding noise to a location, the gateway device 101 will increase the volume of the device so that the noise will not affect the user's experience with the device's audio.

For any of the triggering events, this system allows the gateway device 101 to be a one device system to control any and all devices in a home from a single location in a smart manner to improve experiences within the home.

It should be noted that the gateway device 101 may not be the only device in control of the system and may work with one or more other devices to perform one or more of the steps in FIG. 3. Thus, the present invention should not be limited to requiring only a single gateway device 101 to control all devices.

Figure 4:
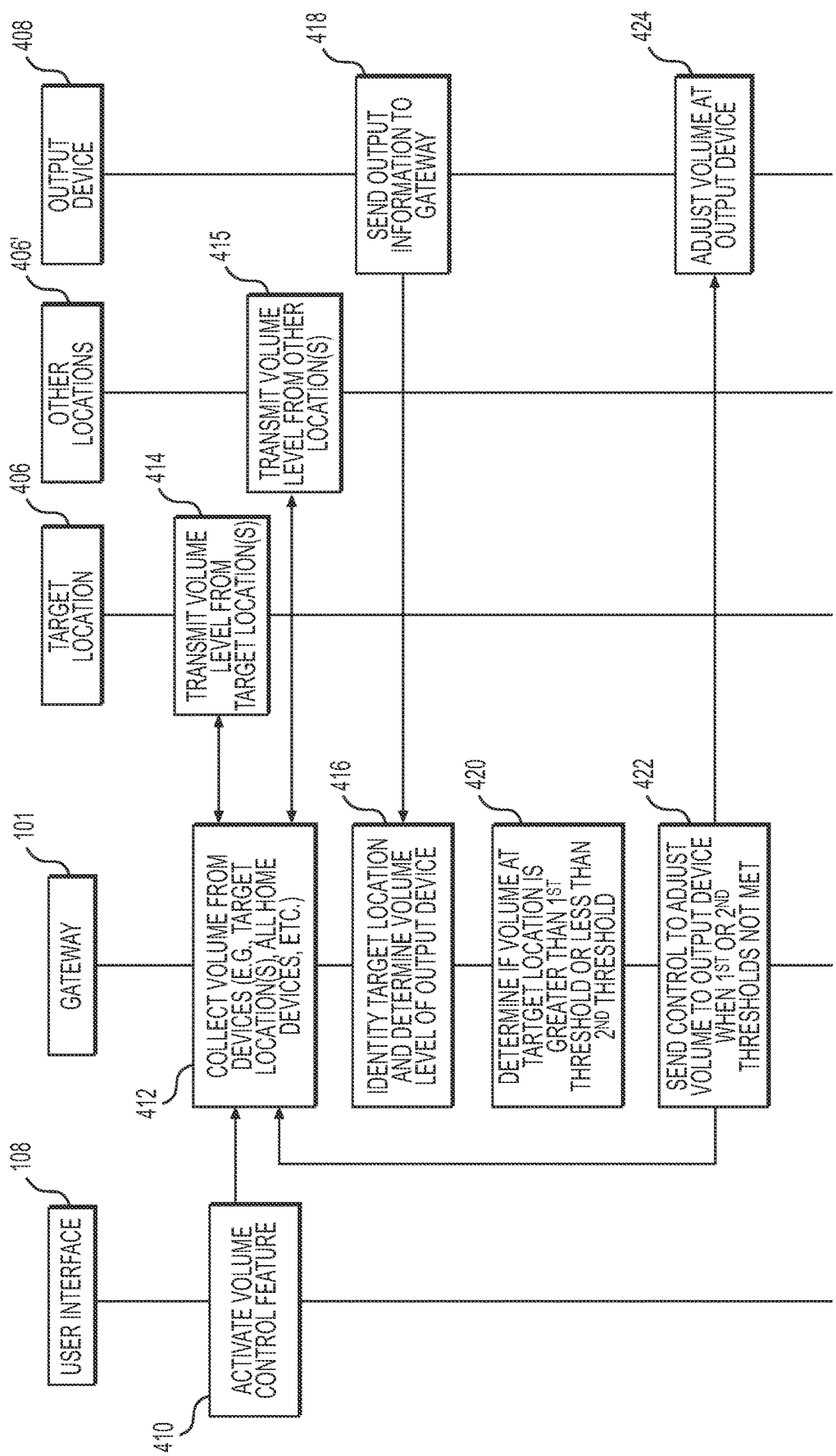

FIG. 4 illustrates a method similar to FIG. 3 but illustrates the devices, including user interface 108, gateway 101, target location 406, and output device 408 (which is one of the connected devices 106) performing certain events.

In block 410, the volume control feature is activated via the user interface 108. This may be performed by the user activating a button on the gateway 101 or sending a signal from an interface on a mobile device. The user interface 108 may be an interface on the gateway 101, interact with an interface on a mobile device or computer, or be the interface on the mobile device or computer that is capable of configuring the gateway 101.

In block 412, the gateway 101 collects volume from the connected devices 106 or other devices in a target location to monitor as well as collecting other information (e.g., noise in the target location, audio from areas other than the target location, motion data to determine where a user is moving to, information from collected devices to determine if a user is interacting with another connected device in the target location, etc.). The gateway 101 can request these connected devices 106 or other devices to enable the microphone to start collecting audio in their locations and periodically or continuously transmit ambient sounds collected by microphones of the connected devices 106 or other devices in their respective locations.

In blocks 414 and 415, the connected devices 106 transmit the audio picked up by their microphones to the gateway 101. Then, the gateway 101 will receive those audio data, identify which connected device 106 or other device the audio is coming from, and then associate that received audio data with the location associated with such connected device 106/other device, as provided on block 416. In this regard, the gateway 101 will always know which location audio is being detected even though audio is being detected at multiple locations. This allows the whole home to be monitored and all of the audio levels among the various locations in the whole home are determined. In this regard, an embodiment of the present application is a whole home monitoring solution.

Next, in block 418, the output device 408 (which is one of the connected devices 106) sends output information to the gateway 101, in some embodiments. For example, the output device 408 could report to the gateway 101 that it is outputting audio at a certain audio level. In this regard, the output device 408 is able to communicate its audio output in order for the gateway 101 to know which devices are outputting certain audio levels.

In block 420, the gateway 101 determines if volume at target locations are greater than the preset threshold maximum or less than a preset minimum, similar to that discussed above with regard to decision blocks 308 and 312, respectively. If so, in block 422, the gateway 101 sends control to adjust volume to output device 408.

As shown in block 424, the gateway 101 sends a control signal to the output device 408 to adjust the volume of the output device 408. When the output device 408 receives such signal, the output device 408 automatically (without user intervention) adjusts (e.g., lowers) the volume. This can be done in single increments so that as the volume is adjusted (e.g., lowered), the audio levels in the target levels are adjusted (e.g., lowered) until the threshold conditions are properly met (e.g., the target location audio level is lower than the predefined threshold).

The above system is thus able to control volume levels at one or more locations in a home using only the gateway 101 device to (1) control the audio/video feed to the connected devices so that the volume of such feed is reduced, and/or (2) send a signal to one or more connected devices 106 for such one or more connected devices 106 to reduce the volume thereof.

It should be understood that the above discussion relates to the audio level of one or more target locations during a triggering event or a certain time period. However, the present invention should not be limited to audio levels and in addition to or in lieu of the audio levels, the gateway device 101 could control other features of the connected devices 106, such as the display levels to reduce the brightness of displays in the home at a certain time of day (e.g., night time), controlling internet to the connected devices 106, or controlling other features or outputs of the controlling devices 106, in a manner similar to those discussed above. For example, for controlling the light of the connected devices 106, cameras or ambient light sensors of devices in the home may detect the light intensity and the gateway device 101 can reduce the light intensity if it is greater than a certain amount (and can do this during certain present time periods).

Whole Home Anti-Distraction Mode Feature

Other embodiments of the present application are discussed below.

Currently, the connected devices 106 have users attention in a home and many users focus their attention on these devices 106 or these devices will request the user to interact therewith (e.g., a phone may ring to request the user to answer, an email may be displayed along with an audible alert on a computer requesting a user's actions, etc.). As mentioned above, these connected devices 106 can be among many electronic devices, such as a television, a mobile phone, gaming consoles, a LAN line phone, computers, etc.

At certain times, families may want to come together and have family members not be distracted by these devices. For example, a family may want to have a family dinner and have each family member be focused on dinner and interacting with each other instead of any diversion of a family member's attention to one of the connected devices 106. As such, the connected devices 106 could be a significant distraction to others, such as families in having family time together or just trying to ensure individuals spend more time interacting with other individuals rather than interacting with the connected devices 106.

Currently, the gateway device 101, as provided in FIG. 1 has capabilities of controlling all of the connected devices 106. Thus, the system 100 shown in FIG. 1 is also applicable to the anti-distraction mode feature discussed in FIGS. 5-8, which will be discussed below.

It should be noted that the features of FIGS. 1-4 could be integrated in with the features of FIGS. 5-8 so that a single gateway device 101 performs all of the features of the home volume monitoring/adjustment mode and the anti-distraction mode feature. However, it should also be noted that the gateway device 101 does not need to perform both of these mode features and instead could only perform one of the mode features. For example, the gateway device 101 could only perform the home volume monitoring/adjustment mode in one embodiment, or the gateway device 101 could only perform the anti-distraction mode feature in another embodiment.

Figure 5:
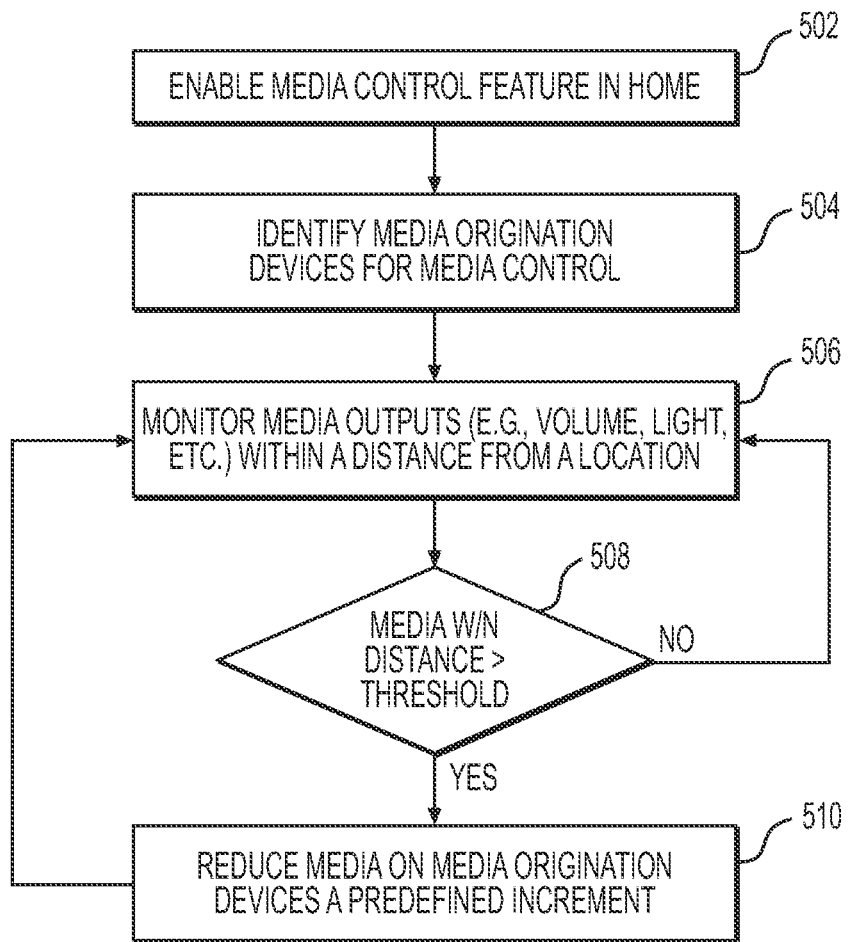
FIG. 5 illustrates a method of home audio management according to some embodiments.
Figure 6:
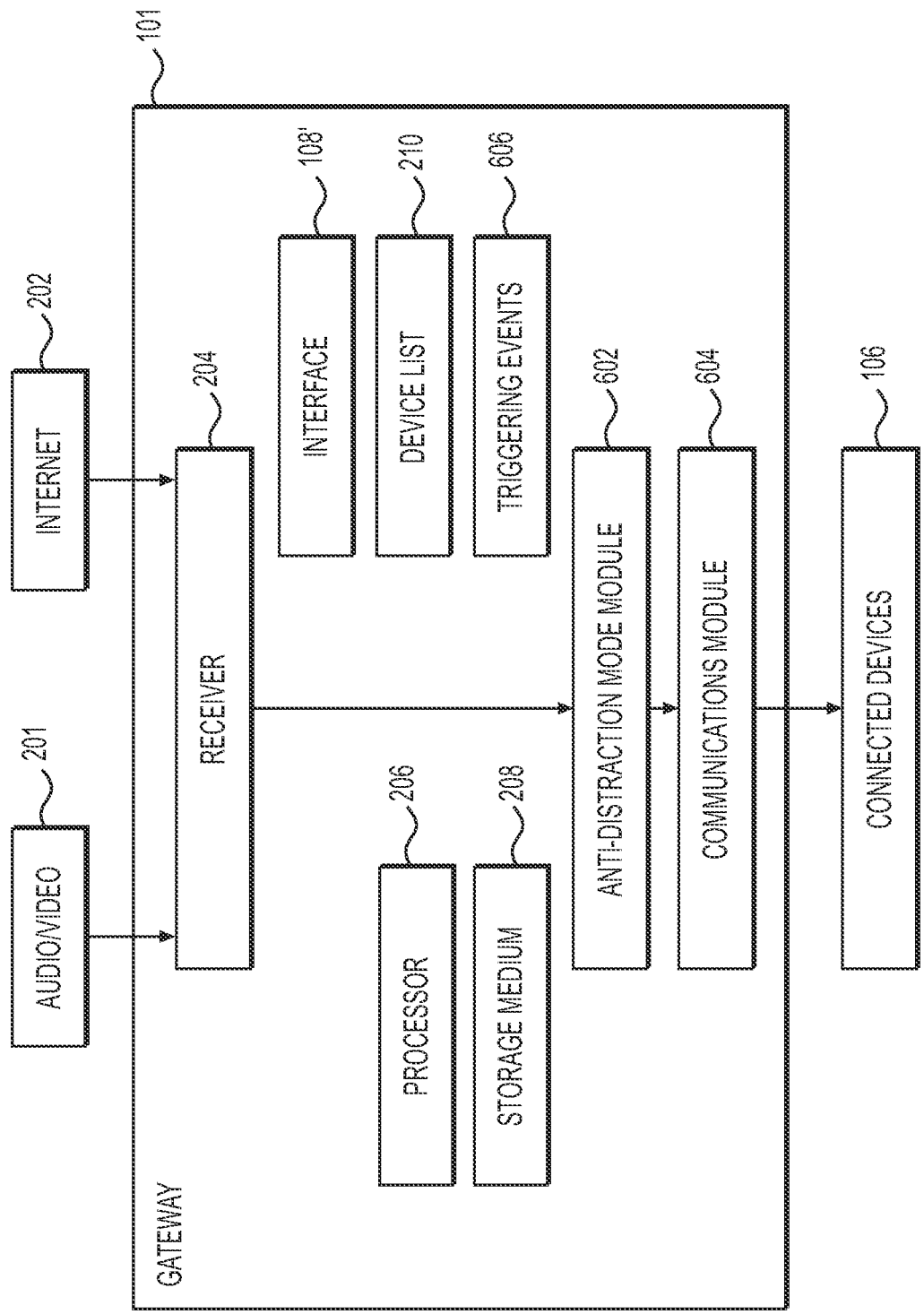
FIG. 6 illustrates an embodiment of a gateway device implementing an anti-distraction mode, according to some embodiments.

Starting first in FIG. 5, FIG. 5 illustrates an embodiment of the gateway device 101 of FIG. 1 but the gateway device 101 in this embodiment is performing the anti-distraction mode feature. The gateway device 101 comprises a user interface 108', a receiver 204, a processor 206, storage medium 208, a device list 210, an anti-distraction mode module 602, and communications module 604. The receiver 204, processor 206, storage medium 208, and device list 210 are similar to those discussed above relative to FIG. 2. The user interface 108' is also similar to user interface 108 in that the user is allows to input data to and monitor with the gateway device 101 except the user interface 108' is configured to be directed to the anti-distraction mode feature.

As mentioned above, the gateway device 101 receives the internet feed 202 and audio/video feed 201 at the receiver 204. The receiver 204 is a port on the gateway device 101 that receives data signals from a wired or wireless connection via network 102. These signals are then processed by the processor 206 and software in the gateway device 101 to effectively receive the respective data feeds from networks 102 and 103 so that they can be delivered to the connected devices 106.

The anti-distraction mode module 602, device list 210, triggering events 606 computer instructions, and other data may be stored in the storage medium 208.

Figure 7:
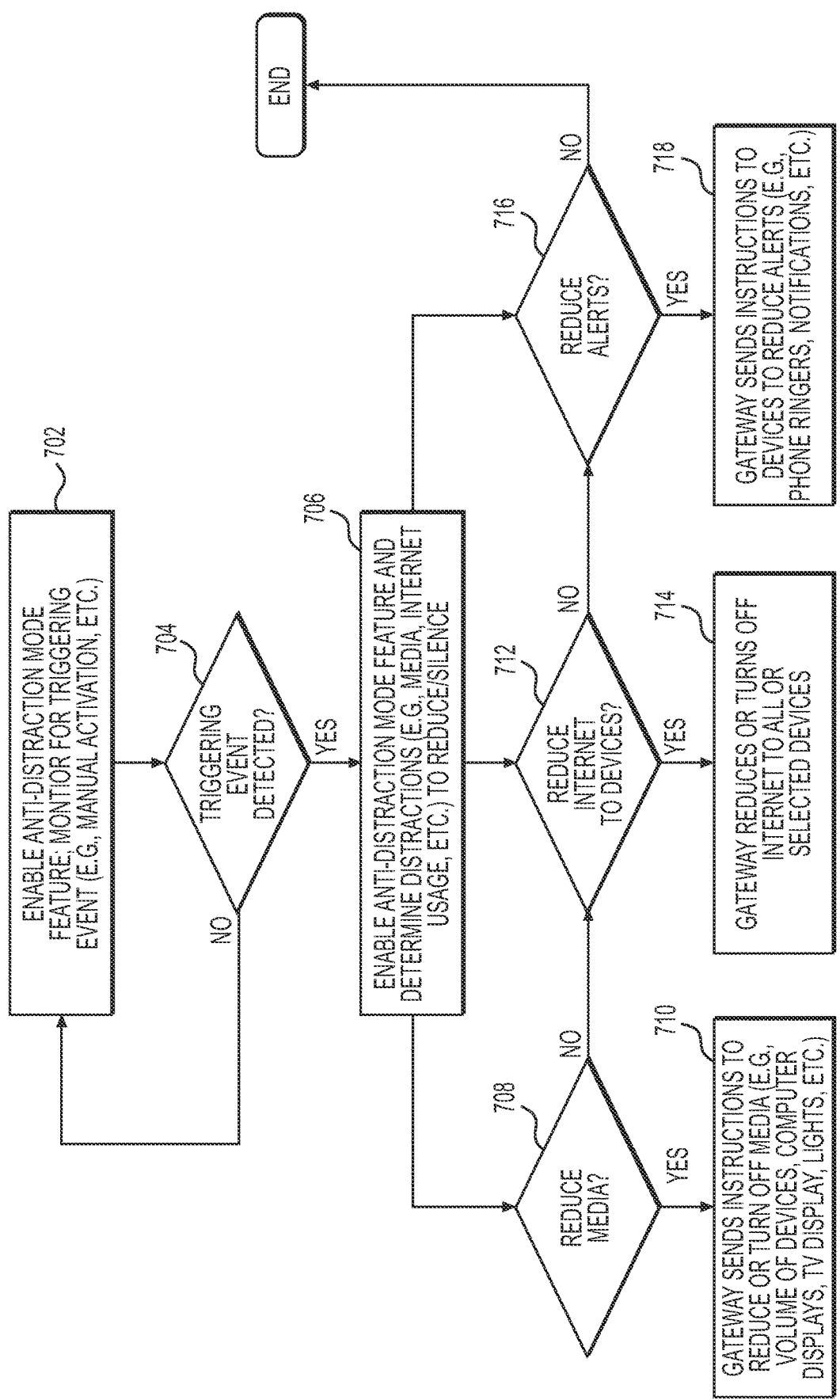
FIGS. 7 and 8 illustrate methods of implementing an anti-distraction mode feature according to some embodiments.
Figure 8:
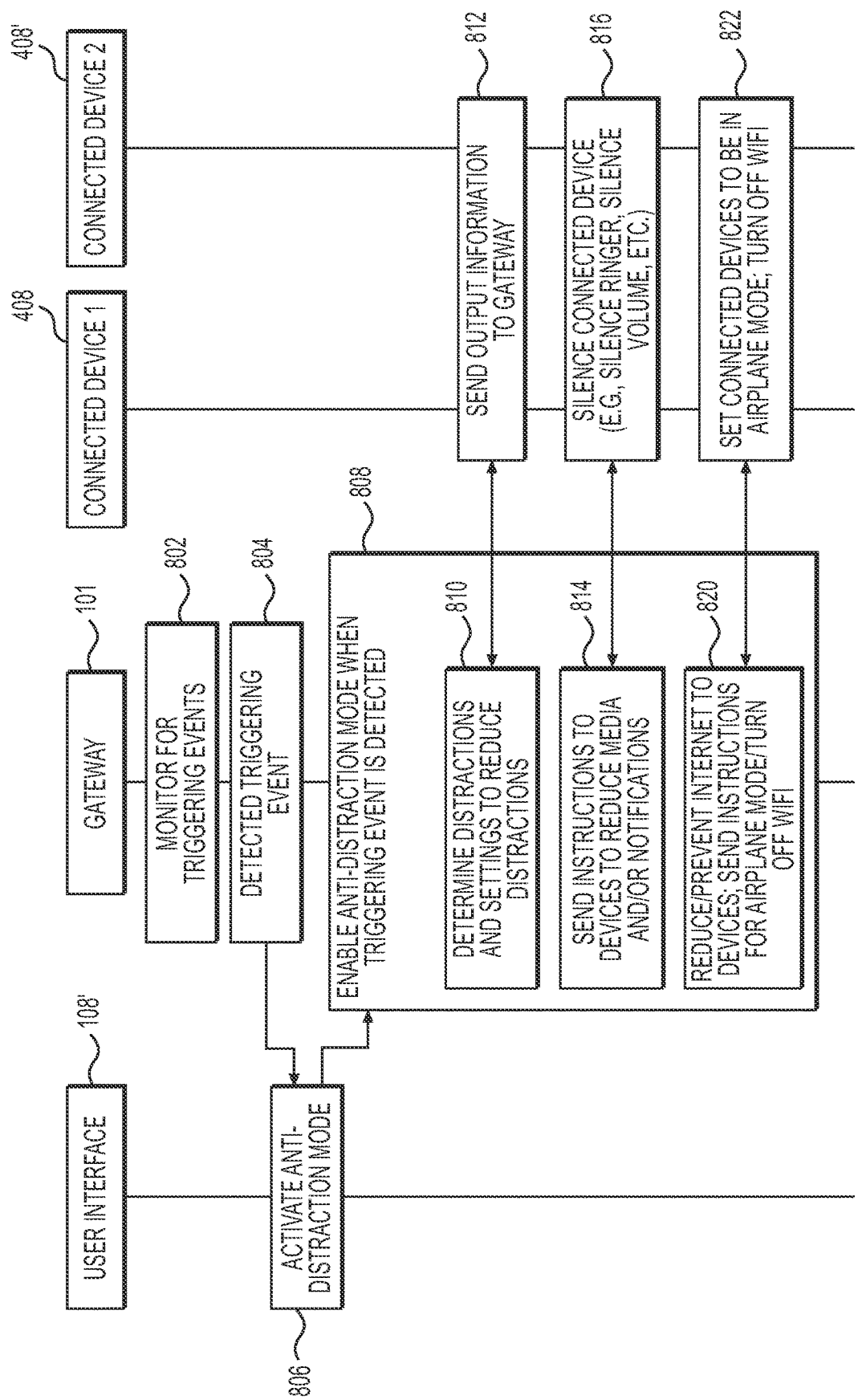

The anti-distraction mode module 602 is a software module with instructions that are executed by the processor to determine if there is a triggering event and to execute the functions of the anti-distraction mode, such as those steps presents in FIGS. 7 and 8.

The anti-distraction mode module 602 can be activated based on a triggering event or be manually started. For example, the anti-distraction mode module 602 can start at a certain time (e.g., at a 6 pm to correspond to a family dinner) set by the user in the interface 108' of the gateway device 101.

The anti-distraction mode module 602 determines what devices to control and how much to control them. For example, the anti-distraction mode module 602 can completely turn off or just reduce internet and/or video/audio feeds to the connected devices. This process is discussed in more depth with regard to FIGS. 7 and 8. The anti-distraction mode module 602 is saved in the gateway device 101 such as in the storage medium 208 or in the volume determination module 212

The communications module 604 communicates with the anti-distraction mode module 602 to deliver and allow/disallow audio and/or internet data to the connected devices 106. This may be done wirelessly over a short range network, such as WiFi or Bluetooth, or via a wired connection. For each connected device 106, the anti-distraction mode module 602 is configured to limit the audio/video feed 201 or internet feed 202 to the specific connected devices 106 at issue. In this regard, the communications module 604 is configured to implement a policy across all connected devices 106 to reduce the audio for the connected devices 106 rather than the connected devices 106 having to each be programmed independently, or manually configured each night. Moreover, because the communications module 604 resides and operates on the gateway device 101, a user of the connected devices 106 cannot override this policy at the connected device level. The policy can only be changed using the interface 108' at the gateway device 101.

FIG. 7 illustrates methods of implementing anti-distraction mode feature according to some embodiments. In block 702, the anti-distraction mode feature is enabled or activated using the interface 108' at the gateway device 101. At this point, the gateway device 101 will determine what connected devices 106 belong in the device list 210 of connected devices 106 based on a function (e.g., audio output capabilities, type of device, etc.) of the device or based on other predefined criteria, in some embodiments. In some embodiments, the device list 210 could be manually inputted by a user or manufacturer and can be modified at any time.

In decision block 704, the gateway device determines if a triggering event is detected. The triggering event may be a preset time of day (such as 6 pm for dinner time, 9 pm bedtime, etc.) in one embodiment. The triggering event may also be recognizing that all family members are together in the same room at the same time of day on a recurring basis, in another embodiment. The triggering event may be an administer activating the mode by hitting an anti-distraction mode button on the interface 108' or another interface that instructs the gateway device 101 to enable the anti-distraction mode. In some embodiments, when the gateway device 101 has determined that a certain set of people are in the same room (e.g., via the user's connected devices, using a motion sensor, facial recognition software via a camera, etc.), the gateway device 101 may send a notice to one or more of the people to solicit anti-distraction mode so that the people are not focused on the connected devices but instead focused on each other or a common activity they are all participating in.

If no triggering event is detected, the method may continue back to block 702; otherwise, if a triggering event is detected, the method may proceed to block 706 where the anti-distraction mode feature is enabled and active and starts determining distractions to reduce. Examples of "distractions" may include any of the connected devices 106 in order to lower the volume of such connected devices 106, lower screen brightness of such connected devices 106, force the connected devices 106 into silent mode or reduce alerts, limit internet feed to the devices 106, etc. at a certain time of the day or during a certain activity or triggering event.

Decision blocks 708, 712, and 716 determine whether to reduce media (video, audio, display brightness, etc.) to the connected devices 106, internet to the connected devices 106, or alter features of the connected devices 106, respectively. These are determined based on predefined settings set up by the user. For example, at dinner time, the anti-distraction mode may be set to reduce media and alerts, but not internet so that the connected devices do not cause an interruption in one embodiment, but in another embodiment, the anti-distraction mode may be set to reduce media, alerts, and internet to the connected devices 106. The former may be helpful if users do not bring their devices to a gathering but the latter is helpful if users carry their device with them at all times.

The gateway device 101 may reduce media, alerts, and internet by controlling these features at the gateway device 101 since all of these features are dependent on data traveling through the gateway device 101. As such, the gateway device 101 can limit or turn off certain feeds to the connected devices 106 and/or send signals to the connected devices 106 for the connected devices 106 to perform certain operations. This can be done with an application installed on each of the connected devices 106 or the gateway device 101 configured to access the settings features of the connected devices over a wireless connection.

As such, if the gateway device 101 determines the media should be reduced at block 708, the gateway device 101 then sends an instruction message to one or more or all of the connected devices 106 to reduce or turn off the media, in one embodiment, or do not respond to requests for media from the connected devices 106 in another embodiment, as provided in block 710. For example, an audio feed from the gateway device 101 to a connected device 106 may be stopped by the gateway device 101 during the triggering event. Alternatively, the connected device 106 could be instructed by the gateway device 101 to reduce its volume and/or screen brightness below a threshold.

Next, if the gateway device 101 determines the internet to the connected devices 106 should be reduced at block 712, the gateway device 101 then sends an instruction message to one or more or all of the connected devices 106 to reduce internet speeds or turn off the internet feed to the connected device 106, in one embodiment, or does not respond to requests for internet from the connected devices 106 in another embodiment, as provided in block 714.

If the gateway device 101 determines the alerts outputted by the connected devices 106 should be reduced or silenced at block 712, the gateway device 101 then sends an instruction message to one or more or all of the connected devices 106 for such connected devices 106 to temporarily enter "Do Not Disturb" mode to reduce the alerts outputted by the connected device 106, in one embodiment, as provided in block 718.

In each of blocks 710, 714, and 718, all of the connected devices 106 in the device list are controlled at once by a common gateway device 101. As such, all of the anti-distraction features are managed and controlled using the gateway device 101.

This is clear from FIG. 8 which shows a method similar to FIG. 7 but illustrates the devices, including user interface 108', gateway 101, connected device 1 408, and connected device 2 408' (which is some of the connected devices 106) performing certain events.

In blocks 802 and 804, the gateway 101 monitors for triggering events and detects at least one triggering event, respectively, in similar to the above discussion with regard to blocks 702 and 704.

Block 806 illustrates that the anti-distraction mode 806 is activated by a user interface 806 and the method may continue to block 808, but it should be understood that the anti-distraction mode 806 can be activated automatically by the gateway 101 in direct response to detecting a triggering event, as provided in block 808.

Once the anti-distraction mode feature 806 is enabled, the gateway device 101 performs blocks 810, 814, and 820 as part of the anti-distraction mode features. Block 810 relates to the gateway device 101 determining distractions (e.g., the connected devices 106) and determining settings to reduce the features of the connected devices 106. The gateway device 101 determines this information by requesting such information from each of the connected devices 408, 408', which is sent to the gateway device 101, as provided in block 812. For example, the gateway device 101 requests the alert information, the internet data requests, the video/audio data requests and outputs, current settings, etc., as such output information is sent to the gateway device 101.

In block 814, the gateway device 101 sends instructions to the connected devices 408, 408' to reduce/silence the connected devices. In response to receiving these instructions, the connected devices 408, 408' are then silenced (e.g., the ringer and volume is silenced), as shown in block 816.

In block 820, the gateway device 101 reduces or prevents the internet feed to the connected devices 408, 408' so that the connected devices 408, 408' do not receive data via the internet. In another embodiment, the gateway device 101 sends instructions to the connected devices 408, 408' to place the devices in airplane mode and/or turning off WiFi, which will block the connected devices 408, 408' from requesting and/or receiving internet, as provided in block 822.

In one embodiment, the gateway device 101 can include a kill command feature which will turn off the child's device completely so that the device will completely power down. This may be accomplished by sending a command from the gateway device 101 to the child's device so that such device then powers down. This can be accomplished through an application installed on the child's device which is in communication with the gateway device 101 and also the internal workings of the child's device.

In another embodiment, it should be understood that the embodiments discussed herein should not be so limiting and other embodiments are also possible. For example, the gateway device could send a low power mode command which will turn the device into low power mode so that the device will go into power saving mode which will reduce the functions and features of the device. This may be accomplished by sending a command from the gateway device 101 to the device so that such device then enters low power mode. This can be accomplished through an application installs on the device which is in communication with the gateway device 101 and also the internal workings of the device.

The above embodiments allow devices to all be managed by a single gateway device instead of needing to be managed independently. In this regard, the gateway device can be used to set a policy for all of the devices in a home.

Although specific embodiments were described herein, the scope of the invention is not limited to those specific embodiments. The scope of the invention is defined by the following claims and any equivalents therein.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a non-transitory computer readable storage medium may be any tangible medium that can contain, or store a program for use by or in connection with an instruction execution system, apparatus, or device.

Aspects of the present disclosure are described above with reference to flowchart illustrations and block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

What is claimed is:

1. A method comprising:
monitoring, by a gateway device comprising a processor, connected devices that are connected to the gateway device, wherein each connected device comprises a transceiver configured to communicate with the gateway device;
measuring, at a target location, a change of audio level that corresponds to a change in an audio output of a first connected device in the connected devices;
determining a weight of contribution of the first connected device to the audio level at the target location based on the change of audio level at the target location;
determining, by the gateway device, whether the first connected device increases the audio level at the target location greater than a predefined threshold; and
in response to the gateway device determining that the first connected device increases the audio level at the target location greater than the predefined threshold, reducing, by the gateway device and based on the weight of contribution, the audio of the first connected device.

2. The method of claim 1, further comprising:
receiving, at the gateway device, an identification of the target location that is separate from a location of the first connected device; and
monitoring, by the gateway device, the target location while the first connected device is outputting audio to determine if the audio level at the target location is greater than the predefined threshold.

3. The method of claim 1, further comprising:
determining whether a first triggering event has occurred;
in response to determining that the first triggering event has occurred, determining a first volume threshold associated with the first triggering event; and
monitoring the audio level at the target location to determine if the audio level is greater than the first volume threshold.

4. The method of claim 3, wherein the triggering event comprises the current time being a predetermined time or detecting a phone call being received at the target location.

5. The method of claim 1, further comprising:
determining whether a first triggering event has occurred;
in response to determining that the first triggering event has occurred, determining a first volume threshold associated with the first triggering event; and
monitoring the audio level at the target location to determine if the audio level is less than the first volume threshold.

6. The method of claim 5, further comprising: increasing the audio of the first connected device, when the triggering event comprises one of detecting a user walking away from a room to the target location, or a high noise event being located at the target location.

7. The method of claim 5, wherein, when the audio level is less than the first volume threshold, increasing the audio of the first connected device.

8. The method of claim 1, further comprising:
sending, by the gateway device, a message to all connected devices so that each of the connected devices changes the current settings so that each of the connected devices do not output alerts or notifications.

9. The method of claim 1, further comprising receiving audio level information from a microphone in the target location.

10. A gateway device comprising:
a processor;
a storage medium for storing a device list and instructions, wherein the processor is configured, when executing the instructions, for:
monitoring connected devices that are connected to the gateway device, wherein each connected device comprises a transceiver configured to communicate with the gateway device;
measuring a change of audio level at a target location in response to a change in an audio output of a first connected device in the connected devices;
determining, based on the change of audio level at the target location, a weight of contribution of the first connected device to the audio level at the target location;
determining whether the first connected device increases the audio level at the target location greater than a predefined threshold; and
in response to the gateway device determining that the first connected device increases the audio level at the target location greater than the predefined threshold, reducing by the gateway device and based on the weight of contribution, audio of the first connected device.

11. The gateway device of claim 10, further comprising:
receiving, at the gateway device, an identification of the target location that is separate from a location of the first connected device; and
monitoring, by the gateway device, the target location while the first connected device is outputting audio to determine if the audio level at the target location is greater than the predefined threshold.

12. The gateway device of claim 10, further comprising:
determining whether a triggering event has occurred;
in response to determining that a first triggering event has occurred, determining a first volume threshold associated with the first triggering event; and
monitoring the audio level at the target location to determine if the audio level is greater than the first volume threshold.

13. The gateway device of claim 10, wherein the processor is further configured for:
sending a message to all connected devices so that each of the connected devices changes the current settings so that each of the connected devices do not output alerts or notifications.

14. The method of claim 3, wherein the reducing audio of the first connected device occurs in response to the current time being a predetermined time or detecting a phone call being received at the target location.

15. A nontransitory computer readable medium embodying instructions that, when executed by a processor of a gateway device, performs a method comprising:
monitoring connected devices that are connected to the gateway device, wherein each connected device comprises a transceiver configured to communicate with the gateway device;
measuring, at a target location, a change of audio level that corresponds to a change in an audio output of a first connected device in the connected devices;
determining, based on the change of audio level at the target location, a weight of contribution of the first connected device to the audio level at the target location;
determining whether the first connected device affects the audio level at the target location greater than a predefined threshold; and
in response to the gateway device determining that the first connected device audio affects the audio level at the target location is greater than the predefined threshold, changing, by the gateway device and based on the weight of contribution, audio of the first connected device.

16. The nontransitory computer readable medium of claim 15, further comprising:
receiving, at the gateway device, an identification of the target location that is separate from a location of the first connected device; and
monitoring, by the gateway device, the target location while the first connected device is outputting audio to determine if the audio level at the target location is greater than the predefined threshold.

17. The nontransitory computer readable medium of claim 15, further comprising:
determining whether a first triggering event has occurred;
in response to determining that the first triggering event has occurred, determining a first volume threshold associated with the first triggering event; and
monitoring the audio level at the target location to determine if the audio level is greater than the first volume threshold.

18. The nontransitory computer readable medium of claim 15, wherein the method further comprises:
sending by the gateway device, a message to all connected devices so that each of the connected devices changes a current setting so that each of the connected devices do not output alerts or notifications.

19. The nontransitory computer readable medium of claim 15, wherein the method further comprises: increasing the audio of the first connected device when detecting a triggering event.

20. The nontransitory computer readable medium of claim 19, wherein the triggering event comprises one of detecting a user walking away from a room to the target location or a high noise event being located at the target location.

\* \* \* \* \*